(12) United States Patent
Park et al.

(10) Patent No.: US 9,002,927 B2
(45) Date of Patent: Apr. 7, 2015

(54) APPARATUS AND METHOD FOR MANAGING REMOTE USER INTERFACE AND SYSTEM FOR THE SAME

(75) Inventors: Ho-Yeon Park, Seoul (KR); Joo-Yeol Lee, Seongnam-si (KR)

(73) Assignee: Samsung Electronics Co., Ltd (KR)

( * ) Notice: Subject to any disclaimer, the term of this patent is extended or adjusted under 35 U.S.C. 154(b) by 228 days.

(21) Appl. No.: 13/181,885

(22) Filed: Jul. 13, 2011

(65) Prior Publication Data

US 2012/0016928 A1      Jan. 19, 2012

(30) Foreign Application Priority Data

Jul. 13, 2010   (KR) .................. 10-2010-0067608

(51) Int. Cl.
| | |
|---|---|
| G06F 15/16 | (2006.01) |
| H04L 12/28 | (2006.01) |
| H04L 29/08 | (2006.01) |
| H04L 12/00 | (2006.01) |
| G06F 3/14 | (2006.01) |
| G06F 9/44 | (2006.01) |

(52) U.S. Cl.
CPC .............. H04L 12/2814 (2013.01); *G06F 3/14* (2013.01); H04L 67/02 (2013.01); *G06F 9/4445* (2013.01); *G09G 2370/042* (2013.01); *G06F 3/1454* (2013.01); *G09G 2360/18* (2013.01); *G06F 3/1462* (2013.01); H04L 12/00 (2013.01); H04L 12/282 (2013.01)

(58) Field of Classification Search
USPC .............. 709/203, 217; 707/999.01; 715/740; 345/619
See application file for complete search history.

(56) References Cited

U.S. PATENT DOCUMENTS

| | | | |
|---|---|---|---|
| 8,260,843 B2 * | 9/2012 | Jun ............................... | 709/203 |
| 2006/0174026 A1 | 8/2006 | Robinson et al. | |
| 2006/0179118 A1 * | 8/2006 | Stirbu ........................... | 709/217 |
| 2007/0073730 A1 * | 3/2007 | Jun ................................ | 707/10 |
| 2007/0136359 A1 | 6/2007 | Iwahara et al. | |
| 2007/0174297 A1 | 7/2007 | Kim | |
| 2008/0016177 A1 | 1/2008 | Jin et al. | |

(Continued)

FOREIGN PATENT DOCUMENTS

| | | |
|---|---|---|
| CN | 101268674 | 9/2008 |
| EP | 1345357 | 9/2003 |

(Continued)

OTHER PUBLICATIONS

For UPnP Version 1.0, "RemoteUIClient: 1 Service Template Version 1.01", XP55088269, Sep. 2, 2004.

(Continued)

*Primary Examiner* — Kyung H Shin
(74) *Attorney, Agent, or Firm* — The Farrell Law Firm, P.C.

(57) ABSTRACT

A system for managing a Remote User Interface (RUI) includes a Remote User Interface Server (RUIS) for sending an update message indicating that an RUI list including at least one RUI has been updated, and transmitting updated RUI list information upon receiving a request for updated RUI list information; and a Remote User Interface Client (RUIC) for sending a request for updated RUI list information to the RUIS upon recognizing from the update message received from the RUIS that an RUI list has been updated, receiving the updated RUI list information from the RUIS in response to the request, and updating existing RUI list information based on the updated RUI list information.

16 Claims, 7 Drawing Sheets

(56) References Cited

U.S. PATENT DOCUMENTS

| | | |
|---|---|---|
| 2009/0210488 A1 | 8/2009 | Lee |
| 2010/0115053 A1 | 5/2010 | Ryu et al. |

FOREIGN PATENT DOCUMENTS

| | | |
|---|---|---|
| JP | 11-175417 | 7/1999 |
| JP | 2007-195187 | 8/2007 |
| JP | 2011-519076 | 6/2011 |
| JP | 2011-530759 | 12/2011 |
| KR | 1020070034341 | 3/2007 |
| KR | 1020070062131 | 6/2007 |
| KR | 1020090020233 | 2/2009 |
| WO | WO 2009/104908 | 8/2009 |
| WO | WO 2010/019000 | 2/2010 |

OTHER PUBLICATIONS

Chinese Office Action dated Oct. 29, 2014 issued in counterpart application No. 201180033817.3.

* cited by examiner

```
<?xml version="1.0"?>
<xs:schema xmlns:xs="http://www.w3.org/2001/XMLSchema" xmlns="urn:schemas-ce-org:cea-2014-server-ext-1-0"
targetNamespace="urn:schemas-ce-org:cea-2014-server-ext-1-0" elementFormDefault="qualified" attributeFormDefault="unqualified">
<xs:element name="uiServerInfo">
  <xs:complexType>
    <xs:sequence>
      <xs:element name="uiListURL" type="xs:anyURI" renewable ="yes" xor "no" minOccurs="1" maxOccurs="1"/>
      <xs:element name="savedUIListURL" type="xs:anyURI" minOccurs="0" maxOccurs="1"/>
      <xs:element name="saveStateStorageURL" type="xs:anyURI" minOccurs="0" maxOccurs="1"/>
    </xs:sequence>
  </xs:complexType>
</xs:element>
</xs:schema>
```

APPARATUS AND METHOD FOR MANAGING REMOTE USER INTERFACE AND SYSTEM FOR THE SAME

PRIORITY

This application claims priority under 35 U.S.C. §119(a) to an application filed in the Korean Intellectual Property Office on Jul. 13, 2010 and assigned Serial No. 10-2010-0067608, the entire disclosure of which is incorporated herein by reference.

BACKGROUND OF THE INVENTION

1. Field of the Invention

The present invention relates generally to a Remote User Interface (RUI), and more particularly, to an apparatus and method for managing an RUI and a system for the same.

2. Description of the Related Art

Several industry standards organizations such as Digital Living Network Alliance (DLNA), Home Audio-Video Interoperability (HAVi), and Universal Plug and Play (UPnP) have conducted studies to improve home network technology, including Remote User Interface (RUI) technology, which may be used in a home network to allow one device to control the functions of other devices. Briefly, the RUI technology, based on client-server architecture, allows an RUI Client (RUIC) to fetch a UI from an RUI Server (RUIS) and helps a user control the RUIS utilizing the UI on the RUIC.

Consumer Electronics Association (CEA)-2014 is a standard for RUI, which defines a protocol and a framework for RUIs in a Universal Plug and Play (UPnP) network and the Internet. In accordance with CEA-2014, an UPnP device (RUIS) provides a user interface in a web page in the form of Consumer Electronics-Hypertext Markup Language (CE-HTML), and a user may control an application of the UPnP device remotely on the web page. CE-HTML, a special version of HTML, is based on Extensible HTML (XHTML).

Figure 1:
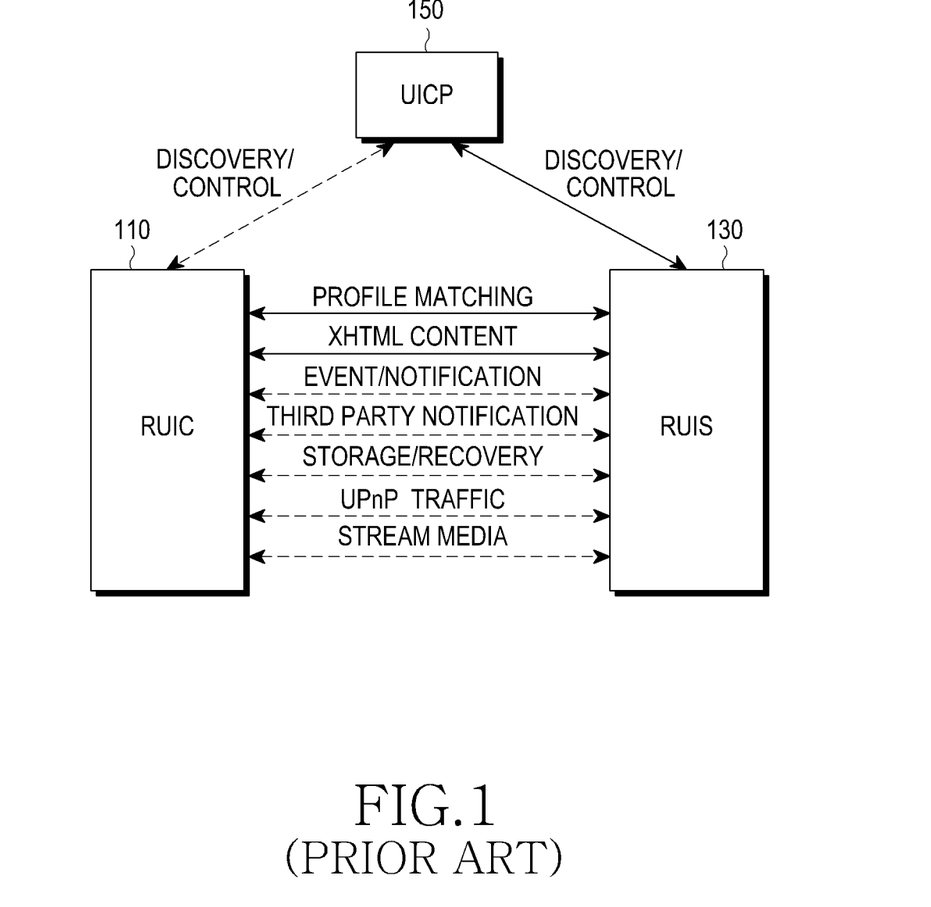
FIG. 1 is a diagram illustrating a configuration of a general UPnP network.

FIG. 1 illustrates a configuration of a general UPnP network. The UPnP network includes an RUIC 110, an RUIS 130, and a UI Control Point (UICP) 150. The RUIC 110 renders and controls an RUI(s) delivered from the RUIS 130. The RUIS 130 provides at least one RUI.

The UICP 150 discovers the RUIC 110 and the RUIS 130, and establishes a connection between the RUIC 110 and the RUIS 130. Although the RUIC 110 and the UICP 150 are illustrated as separate elements in the drawing, the RUIC 110 may directly discover the RUIS 130 when the UICP 150 is embedded in the RUIC 110.

If the RUIC 110 does not include the UICP 150, and a separate UICP intends to send an RUI of the RUIS 130 to the RUIC 110, even the RUIC 110 may be discovered by the UICP through discovery.

To use an RUI in the home network, discovery for the RUIC 110 and the RUIS 130 is performed. After performing the discovery, the RUIC 110 acquires an RUI page depending on a Uniform Resource Locator (URL) with the RUI page, which is included in a device description. Because the RUI page is composed to make it possible to control an application of the RUIS 130, the RUIC 110 may control the application of the RUIS 130 using the RUI page.

Figure 2:
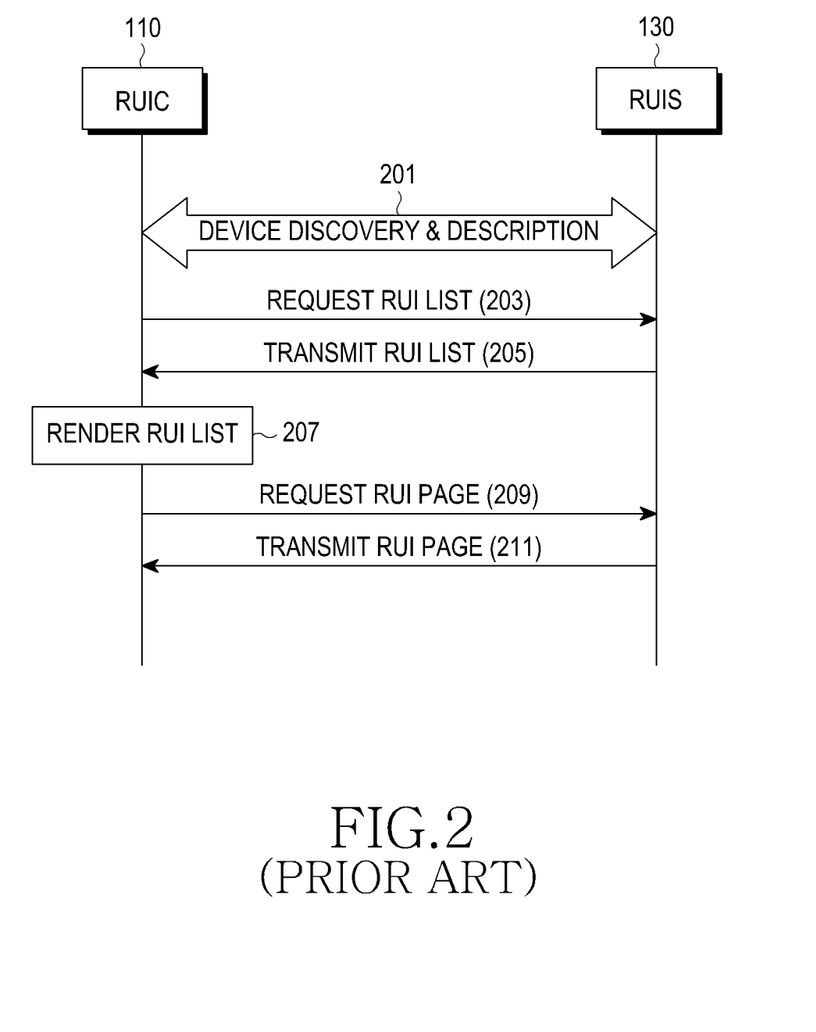
FIG. 2 is a signaling diagram illustrating a signaling operation for communication between an RUIS and an RUIC according to the prior art.

FIG. 2 illustrates a signaling operation for communication between an RUIS and an RUIC according to the prior art.

In order to use an RUI stored in the RUIS 130, the RUIC 110 needs to receive a RUI list and a discovery procedure between the RUIC 110 and the RUIS 130 is required. Therefore, in step 201, devices (e.g., RUIC 110 and RUIS 130) discover each other and receive an associated device description.

In step 203, the RUIC 110 sends a request for an RUI list to the RUIS 130 depending on a URL with an RUI page, which is included in the device description. In step 205, the RUIS 130 sends an RUI list to the RUIC 110 in response to the RUI list request.

The RUIC 110 provides the RUI list received from the RUIS 130 in step 207, and sends a request for an RUI page to the RUIS 130 in step 209. In step 211, the RUIS 130 provides or transmits the RUI page to the RUIC 110 in response to the RUI page request.

Currently, however, even though an RUI list in an RUIS has been updated after an RUIC received an RUI page from the RUIS, the RUIC is incapable of receiving an updated RUI list.

SUMMARY OF THE INVENTION

Accordingly, an aspect of the present invention is to address at least the aforementioned limitations and problems in the prior art and to provide at least the advantages described below. Accordingly, an aspect of the present invention provides an apparatus and method for notifying an RUIC of an update, if any, of an RUI list in an RUIS to update the RUI list, and a system for the same.

Another aspect the present invention provides an apparatus and method for allowing an RUIC to use an updated RUI list, and a system for the same.

In accordance with one aspect of the present invention, there is provided a system for managing a Remote User Interface (RUI). The system includes a Remote User Interface Server (RUIS) for sending an update message indicating that an RUI list including at least one RUI has been updated, and transmitting updated RUI list information upon receiving a request for updated RUI list information; and a Remote User Interface Client (RUIC) for sending a request for updated RUI list information to the RUIS upon recognizing from the update message received from the RUIS that an RUI list has been updated, receiving the updated RUI list information from the RUIS in response to the request, and updating existing RUI list information based on the updated RUI list information.

In accordance with another aspect of the present invention, there is provided an apparatus for managing a Remote User Interface (RUI) in a Remote User Interface Server (RUIS). The apparatus includes a manager for managing at least one RUI to be provided to a Remote User Interface Client (RUIC), and determining whether an RUI list including the at least one RUI has been updated; a generator for generating an update message if the RUI list has been updated; and a transceiver for sending the generated update message to the RUIC, receiving a request for updated RUI list information in response to the update message, and transmitting the updated RUI list information to the RUIC in response to the received request for updated RUI list information.

In accordance with another aspect of the present invention, there is provided a method for managing a Remote User Interface (RUI) in a Remote User Interface Server (RUIS). The method includes determining whether an RUI list including at least one RUI has been updated; if the RUI list has been updated, generating an update message and sending the update message to a Remote User Interface Client (RUIC); and upon receiving a request for updated RUI list information in response to the update message, transmitting updated RUI list information to the RUIC in response to the request for updated RUI list information.

In accordance with another aspect of the present invention, there is provided an apparatus for managing a Remote User Interface (RUI) in a Remote User Interface Client (RUIC). The apparatus includes a parser for parsing an update message received from a Remote User Interface Server (RUIS); a manager for managing at least one RUI provided from the RUIS, generating a request message for requesting the RUIS to provide updated RUI list information upon recognizing from the received update message that an RUI list has been updated, and updating existing RUI list information based on the updated RUI list information upon receiving the updated RUI list information in response to the request message; and a transceiver for receiving the update message, delivering the received update message to the parser, sending the request message generated by the manager to the RUIS, and delivering the updated RUI list information to the manager in response to the request message.

In accordance with another aspect of the present invention, there is provided a method for managing a Remote User Interface (RUI) in a Remote User Interface Client (RUIC). The method includes sending a request for updated RUI list information to a Remote User Interface Server (RUTS) in response to an update message received from the RUIS; receiving the updated RUI list information from the RUIS in response to the request; and updating existing RUI list information based on the updated RUI list information.

BRIEF DESCRIPTION OF THE DRAWINGS

The above and other aspects, features and advantages of certain embodiments of the present invention will be more apparent from the following description taken in conjunction with the accompanying drawings, in which.

Throughout the drawings, the same drawing reference numerals will be understood to refer to the same elements, features and structures.

DETAILED DESCRIPTION OF EMBODIMENTS OF THE PRESENT INVENTION

Various embodiments of the present invention will now be described in detail with reference to the accompanying drawings. In the following description, specific details such as detailed configurations and components are merely provided to assist the overall understanding of the embodiments of the present invention. Therefore, various changes and modifications of the embodiments described herein can be made without departing from the scope and spirit of the invention. In addition, descriptions of well-known functions and constructions are omitted for clarity and conciseness.

An RUI service, to which the present invention is directed, is a service in which an RUIS provides an RUI(s), and an RUIC may control a device in a remote place on the provided RUI. The present invention updates an RUI list in an RUIC each time an RUI list in an RUIS is updated in the RUI service.

Figure 3:
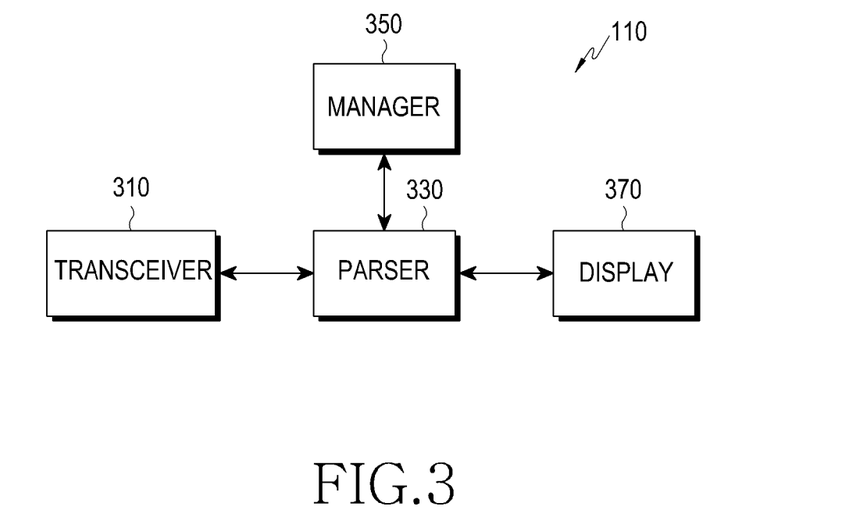
FIG. 3 is a block diagram illustrating a structure of an RUIC according to an embodiment of the present invention.

FIG. 3 illustrates a structure of an RUIC according to an embodiment of the present invention. The RUIC 110 includes a transceiver 310, a parser 330, a manager 350, and a display 370.

The transceiver 310 receives an update message from the RUIS 130, sends a request message for requesting to provide updated RUI list information in response to the update message, and receives the updated RUI list information in response to the request message.

The parser 330 parses the update message, and determines in which method it will receive the updated RUI list depending on the parsing results. The parser 330 parses information about a location of an RUI list, where the RUIC 110 can receive the RUI list, for example, determines if a URL has been changed. If the URL has not been changed, the parser 330 determines to receive the RUI list depending on a value of a uiListURL Element written in a device description. On the other hand, if the URL has been changed, the parser 330 renders the updated RUI list information included in the update message, and then determines to receive an RUI list depending on a changed value of the uiListURL Element, which is the URL. The parser 330 may determine whether a URL has been changed, by checking if URL information is included in the update message.

The device description will be described in detail below with reference to FIG. 5. The manager 350, a component for storing and managing RUI list information provided from the RUIS 130, generates a request message for requesting to provide updated RUI list information depending on the parsing results by the parser 330, and updates RUI list information based on the RUI list information received from the RUIS 130.

The display 370 displays the updated RUI list information. The display 370 may display the updated-RUI list information right after the update was performed in the manager 350, or may display the updated-RUI list information upon the request of the user.

Figure 4:
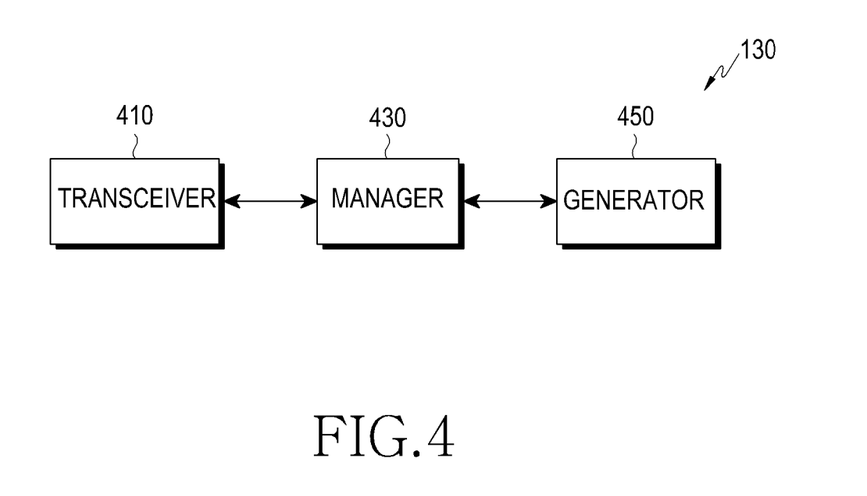
FIG. 4 is a block diagram illustrating a structure of an RUIS according to an embodiment of the present invention.

FIG. 4 illustrates a structure of an RUIS according to an embodiment of the present invention. The RUIS 130 includes a transceiver 410, a manager 430, and a generator 450.

The transceiver 410 sends an update message to the RUIC 110, receives a request message for requesting to provide updated RUI list information from the RUIC 110, and sends updated RUI list information in response to the request message.

The manager 430 stores and manages at least one RUI to be provided to the RUIC 110, and determines if an RUI list including the at least one RUI has been updated.

The generator 450 generates an update message according to the determination results, and generates updated RUI list information in response to the request message received from the RUIC 110. Otherwise, the generator 450 may generate updated RUI list information in advance before receiving the request message from the RUIC 110.

The update message mentioned in the present invention, which is a message to be sent from an RUIS to an RUIC, includes at least one of header information, delivery target information, multicast address information, URL change/non-change information, changed URL information, and unchanged URL information. If necessary, the update message may further include additional information in addition to the above six kinds of information.

Figure 5:
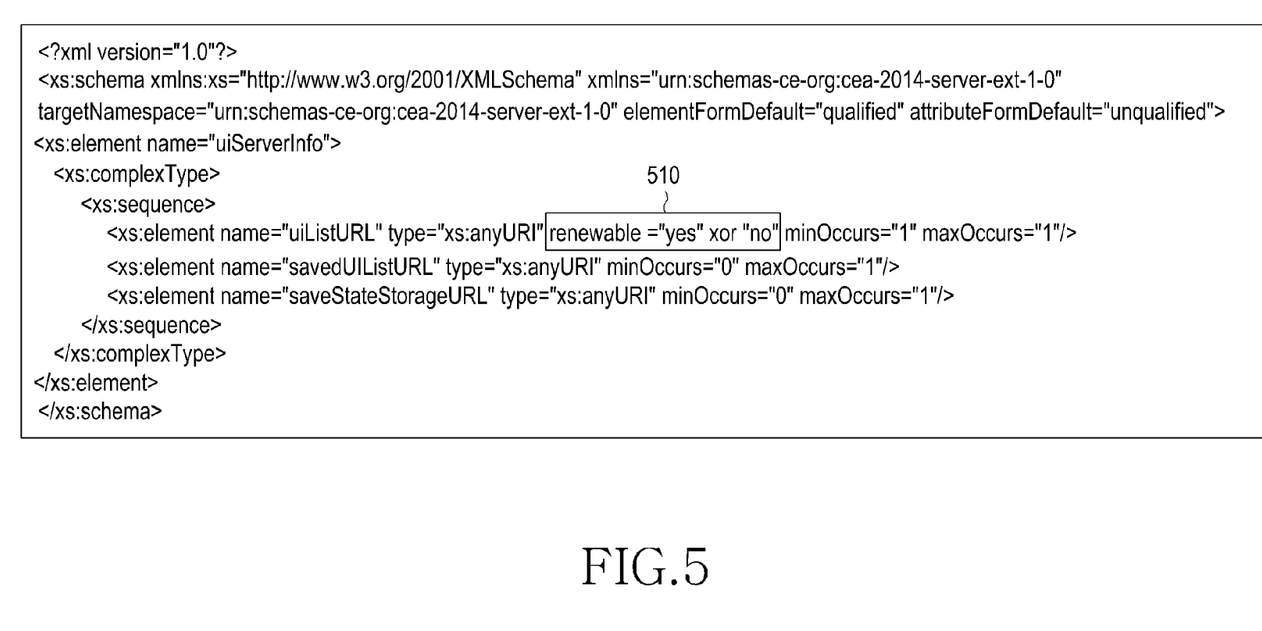
FIG. 5 is a diagram illustrating a device description according to an embodiment of the present invention.

FIG. 5 illustrates a device description according to an embodiment of the present invention. The device description, an information element provided from the RUIS 130 to the RUIC 110 in step 201 of FIG. 2, is used to indicate whether the RUIS 130 may provide an updated RUI list to the RUIC 110 depending on a 'renewable' attribute included in the existing uiListURL element.

Referring to FIG. 5, if a 'renewable' attribute 510 is set to 'yes', the RUIS 130 may provide an updated RUI list to the RUIC 110. However, if the 'renewable' attribute 510 is set to 'no', the RUIS 130 may not provide an updated RUI list to the RUIC 110. That is, the 'renewable' attribute 510 makes it possible for the RUIC 110 to determine if it can receive an updated RUI list from the RUIS 130. This 'renewable' attribute is not limited to the 'renewable' attribute 510 illustrated in FIG. 5 in terms of its location, and may exist in any location in the device description.

Figure 6:
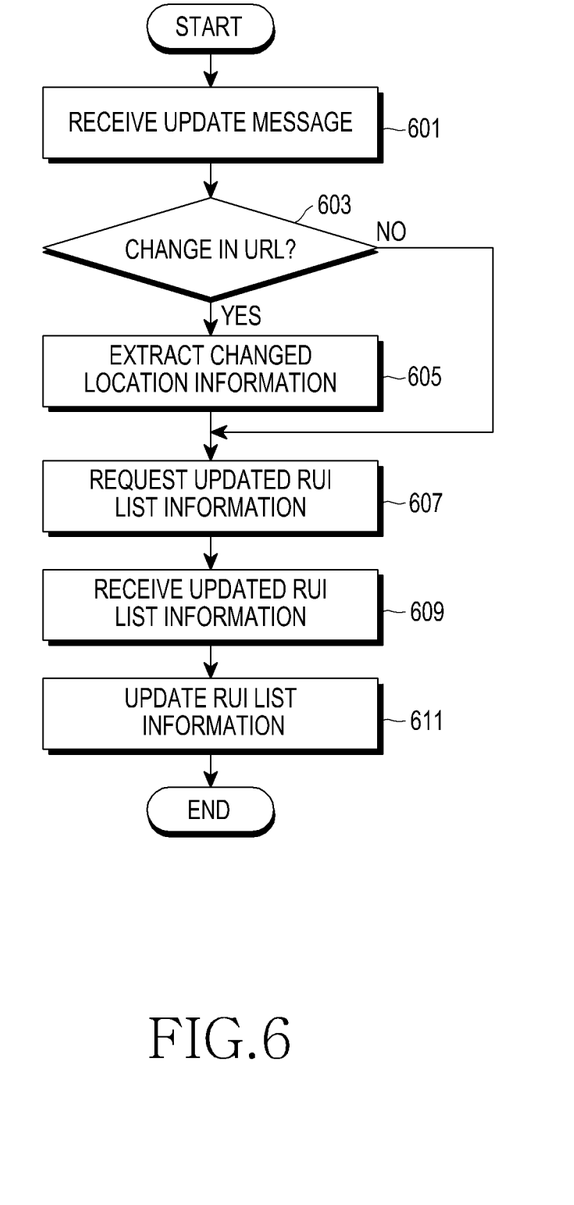
FIG. 6 is a flowchart illustrating an RUI list management operation in an RUIC according to an embodiment of the present invention.

FIG. 6 illustrates an RUI list management operation in an RUIC according to an embodiment of the present invention. In step 601, an RUIC 110 receives an update message from an RUIS 130. In step 603, the RUIC 110 parses the update message, and determines in which method it will receive an updated RUI list depending on the parsing results. Here, the RUIC 110 parses information about a location of an RUI list, where the RUIC 110 can receive the RUI list, for example, determines if a URL has been changed. The RUIC 110 may determine if a URL has been changed, by checking if a URL is included in the update message. That is, if a URL is included in the update message, the RUIC 110 may determine that the URL has been changed. If no URL is included in the update message, the RUIC 110 may determine that the URL has not been changed.

If the RUIC 110 parses the update message, and determines in step 603 that a URL of the RUI list has been changed, the RUIC 110 extracts changed location information (i.e., changed URL information) included in the update message in step 605, and requests to provide updated RUI list information using a changed value of the uiListURL Element, which is the URL, in step 607.

The RUIC 110 receives updated RUI list information from the RUIS 130 in response to the request in step 609, and updates its RUI list information based on the updated RUI list information in step 611.

However, if the RUIC 110 parses the update message, and determines in step 603 that the URL of the RUI list has not been changed, the RUIC 110 proceeds to step 607, skipping step 605 and may request the updated RUI list information using the existing unchanged URL.

Figure 7:
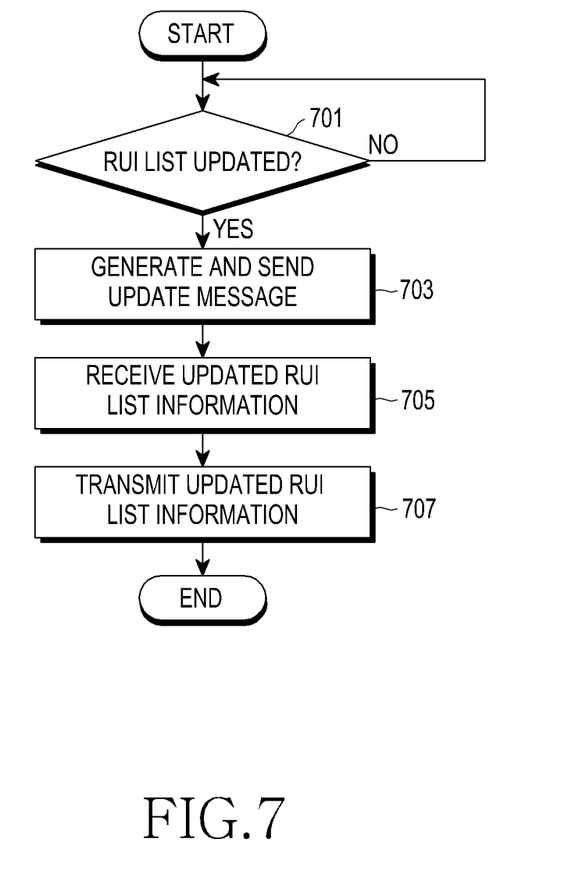
FIG. 7 is a flowchart illustrating an RUI list management operation in an RUIS according to an embodiment of the present invention.

FIG. 7 illustrates an RUI list management operation in an RUIS according to an embodiment of the present invention. In step 701, an RUIS 130 determines if an RUI list including at least one RUI has been updated. If it is determined in step 130 that the RUI list has been updated, the RUIS 130 generates an update message and sends it to an RUIC 110 in step 703.

The RUIS 130 receives a request for updated RUI list information from the RUIC 110 in response to the update message in step 705, and transmits the updated RUI list information in response to the request from the RUIC 110 in step 707.

Figure 8:
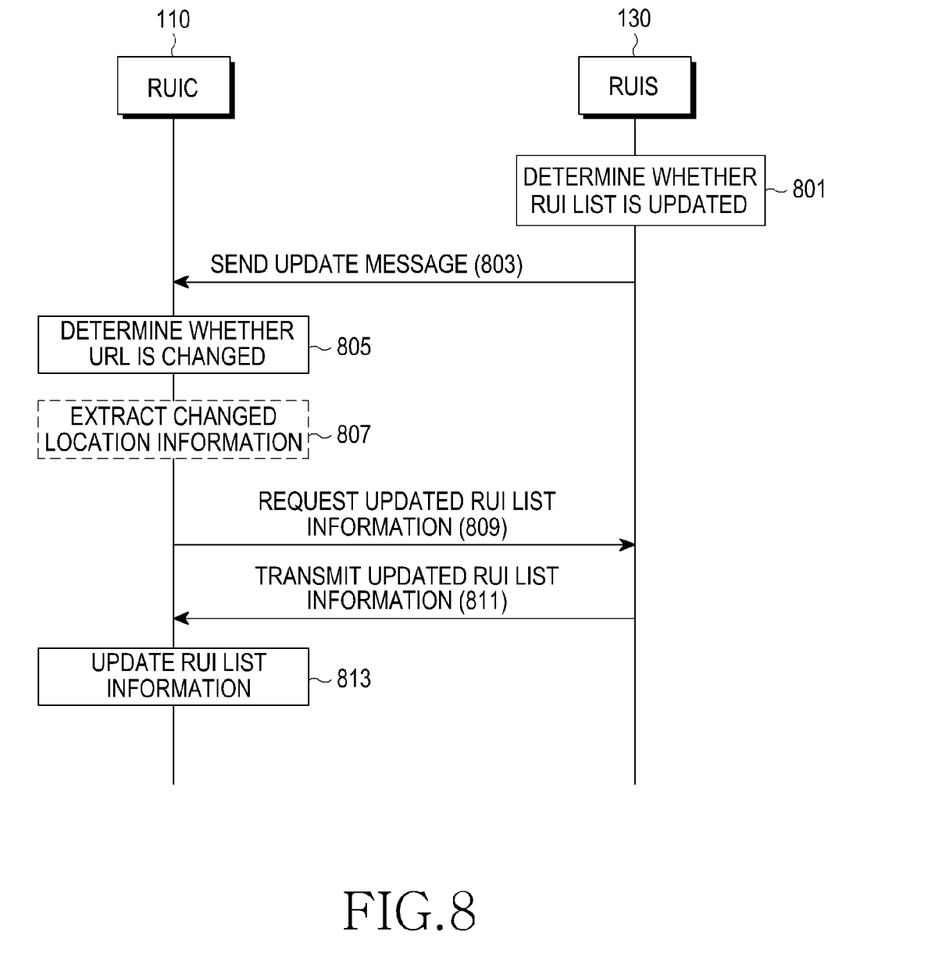
FIG. 8 is a signaling diagram illustrating a signaling operation for communication between an RUIC and an RUIS according to an embodiment of the present invention.

FIG. 8 illustrates a signaling operation for communication between an RUIC and an RUIS according to an embodiment of the present invention. In step 801, an RUIS 130 determines if its RUI list has been updated. If the RUI list has been updated, the RUIS 130 sends an update message to an RUIC 110 in step 803.

In step 805, the RUIC 110 determines if a URL of the RUI list has been changed by parsing the update message received from the RUIS 130. If it is determined in step 805 that the URL of the RUI list has been changed, the RUIC 110 extracts the changed location information (i.e., changed URL information) included in the update message in step 807, and requests the RUIS 130 to provide updated RUI list information using a changed value of the uiListURL Element, which is the URL, in step 809.

However, if it is determined in step 805 that the URL of the RUI list has not been changed, the RUIC 110 proceeds to step 809, skipping step 807.

In step 811, the RUIS 130 transmits the updated RUI list information to the RUIC 110 in response to the request in step 809. Upon receiving the updated RUI list information, the RUIC 110 updates its RUI list information based on the updated RUI list information in step 813.

As is apparent from the foregoing description, if an RUI list in an RUIS is updated, the present invention notifies an RUIC of the update to update its RUI list, making it possible for the RUIC to use the updated RUI list.

While the present invention has been shown and described with reference to certain embodiments thereof, it will be understood by those skilled in the art that various changes in form and details may be made therein without departing from the spirit and scope of the present invention as defined by the appended claims and their equivalents.

What is claimed is:

1. An apparatus for managing a remote user interface (RUI) in a remote user interface server (RUIS), the apparatus comprising:
    a controller configured to determine whether an RUI list including at least one RUI has been updated and to generate an update message if the RUI list has been updated;
    a transceiver configured to send the update message to a remote user interface client (RUIC) if the RUI list has been updated, to receive a request message for updated RUI list information from the RUIC, and to transmit updated RUI list information to the RUIC upon receiving the request message for updated RUI list information in response to the update message; and
    a memory for storing instructions for the controller,
    wherein the request message for the updated RUI list information is transmitted from the RUIC based on at least one of location information included in the update message sent to the RUIC and predetermined location information.

2. The apparatus of claim 1, wherein the update message includes at least one of header information, delivery target information, multicast address information, uniform resource locator (URL) change/non-change information, changed URL information, and unchanged URL information.

3. The apparatus of claim 1, wherein if the RUIC is discovered by a discovery procedure of a neighboring device, a device description is generated for notifying whether an RUI list information update function is provided and the transceiver provides the device description to the RUIC.

4. A method for managing a remote user interface (RUI) in a remote user interlace server (RUIS), the method comprising:
    determining whether an RUI list including at least one RUI has been updated;

generating an update message and sending the update message to a remote user interface client (RUIC) if the RUI list has been updated;

receiving a request message for updated RUI list information from the RUIC; and transmitting updated RUI list information to the RUIC upon receiving the request message for updated RUI list information in response to the update message, wherein the request message for updated RUI list information is transmitted from the RUIC based on at least one of location information included in the update message sent from the RUIC and predetermined location information.

5. The method of claim 4, wherein the update message includes at least one of header information, delivery target information, multicast address information, uniform resource locator (URL) change/non-change information, changed URL information, and unchanged URL information.

6. The method of claim 4, further comprising:

generating a device description for notifying whether an RUI list information update function is provided if the RUIC is discovered by a discovery procedure of a neighboring device; and transmitting the device description to the RUIC.

7. An apparatus for managing a remote user interface (RUI) in a remote user interface client (RUIC), the apparatus comprising:

a transceiver configured to receive, from a remote user interface server (RUIS), an update message indicating that an RUI list including at least one updated RUI has been updated, to send a request message for updated RUI list information to the RUIS in response to the update message, and to receive the updated RUI list information from the RUIS in response to the request message;

a controller configured to update RUI list information based on the updated RUI list information; and a memory for storing instructions for the controller, wherein the request message for the updated RUI list information is transmitted to the RUIS based on at least one of location information included in the update message received from the RUIS and predetermined location information.

8. The apparatus of claim 7, wherein the update message includes at least one of header information, delivery target information, multicast address information, uniform resource locator (URL) change/non-change information, changed URL information, and unchanged URL information.

9. The apparatus of claim 7, wherein the location information is uniform resource locator (URL) information.

10. The apparatus of claim 9, wherein the controller is configured to determine whether URL information is included in the update message, and to recognize that the URL information has been changed if the URL information is included in the update message and to recognize that the URL information has not been changed if the URL information is not included in the update message.

11. The apparatus of claim 10, wherein the transceiver, upon recognizing that the URL information has been changed, is configured to send the request message based on the URL information included in the update message, and upon recognizing that the URL information has not been changed, to send the request message based on the predetermined URL information.

12. The apparatus of claim 9, wherein the RUIC determines whether an RUI list information update function is supportable by the RUIS, after recognizing the RUIS by a discovery procedure of a neighboring device, based on a renewable attribute written in a device description being provided from RUIS.

13. A method for managing a remote user interface (RUI) in a remote user interface client (RUIC), the method comprising:

receiving, from a remote user interface server (RUIS), an update message indicating that an RUI list including at least one RUI has been updated;

sending a request message for updated RUI list information to the RUIS in response to the update message;

receiving the updated RUI list information from the RUIS in response to the request message; and updating RUI list information based on the updated RUI list information, wherein the request message for the updated RUI list information is transmitted to the RUIS based on at least one of location information included in the update message received from the RUIS and predetermined location information.

14. The method of claim 13, wherein the update message includes at least one of header information, delivery target information, multicast address information, uniform resource locator (URL) change/non-change information, changed URL information, and unchanged URL information.

15. The method of claim 13, wherein the location information is uniform resource locator (URL) information.

16. The method of claim 15, wherein the sending the request message for updated RUI list information comprises:

determining whether URL information is included in the update message;

sending the request message for updated RUI list information if the URL information is included in the update message, based on the URL information included in the update message; and sending the request message for updated RUI list information if the URL information is not included in the update message, based on the predetermined URL information.

* * * * *